US 9,987,812 B2

(12) United States Patent
Kitai

(10) Patent No.: US 9,987,812 B2
(45) Date of Patent: Jun. 5, 2018

(54) VULCANIZATION DEVICE FOR PNEUMATIC TIRE AND METHOD FOR VULCANIZING PNEUMATIC TIRE

(71) Applicant: The Yokohama Rubber Co., LTD., Minato-ku, Tokyo (JP)

(72) Inventor: Hirotaka Kitai, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days. days.

(21) Appl. No.: 15/525,275

(22) PCT Filed: Nov. 6, 2015

(86) PCT No.: PCT/JP2015/081302
§ 371 (c)(1),
(2) Date: May 8, 2017

(87) PCT Pub. No.: WO2016/072489
PCT Pub. Date: May 12, 2016

(65) Prior Publication Data
US 2017/0334158 A1    Nov. 23, 2017

(30) Foreign Application Priority Data

Nov. 7, 2014  (JP) .................................. 2014-226630

(51) Int. Cl.
*B29D 30/06*       (2006.01)
*B29K 105/24*     (2006.01)

(52) U.S. Cl.
CPC ..... *B29D 30/0654* (2013.01); *B29D 30/0602* (2013.01); *B29D 30/0601* (2013.01);
(Continued)

(58) Field of Classification Search
CPC ........ B29D 30/0601; B29D 2030/0666; B29D 2030/0667; B29D 30/0662; B29D 2030/0673; B29C 35/04; B29C 33/04
See application file for complete search history.

(56) References Cited

U.S. PATENT DOCUMENTS 9,028,738 B2 *  5/2015  Mizuta ............... B29D 30/0601
                                                            264/326
9,308,700 B2 *  4/2016  Mizuta ............... B29D 30/0601
(Continued)

FOREIGN PATENT DOCUMENTS

JP     H09-076239      3/1997
JP     2008-168490    7/2008
(Continued)

OTHER PUBLICATIONS

International Search Report for International Application No. PCT/JP2015/081302 dated Feb. 2, 2016, 4 pages, Japan.

*Primary Examiner* — James P Mackey
(74) *Attorney, Agent, or Firm* — Thorpe North & Western

(57) ABSTRACT

Provided are a vulcanization device for a pneumatic tire and a method for vulcanizing a pneumatic tire. A pressurizing medium having a relatively low pressure is supplied through a pressurizing medium low-pressurization/supply line into a vulcanization bladder having a tube-like shape inserted into a green tire in a vulcanization mold to inflate the vulcanization bladder. Thereafter, a heating medium is supplied through a heating medium supply line into the vulcanization bladder (2). Then, a pressurizing medium having a relatively high pressure is supplied through a pressurizing medium supply line into the vulcanization bladder to increase internal pressure of the vulcanization bladder while the media in the vulcanization bladder are circulated through a circulation line extending outside the vulcanization bladder, thereby vulcanizing the green tire.

4 Claims, 3 Drawing Sheets

(52) U.S. Cl.
CPC .. *B29D 30/0662* (2013.01); *B29D 2030/0655* (2013.01); *B29D 2030/0659* (2013.01); *B29D 2030/0667* (2013.01); *B29D 2030/0673* (2013.01); *B29K 2105/246* (2013.01)

(56) References Cited

U.S. PATENT DOCUMENTS

| | | | |
|---|---|---|---|
| 2010/0007038 A1* | 1/2010 | Mitamura | B29C 35/007 264/40.3 |
| 2012/0319330 A1 | 12/2012 | Mizuta et al. | |
| 2013/0062803 A1 | 3/2013 | Mizuta et al. | |

FOREIGN PATENT DOCUMENTS

| | | |
|---|---|---|
| JP | 2011-143585 | 7/2011 |
| JP | 2013-000922 | 1/2013 |
| JP | 2013-006379 | 1/2013 |
| JP | 2013-056488 | 3/2013 |
| JP | 2013-159049 | 8/2013 |

\* cited by examiner

VULCANIZATION DEVICE FOR PNEUMATIC TIRE AND METHOD FOR VULCANIZING PNEUMATIC TIRE

TECHNICAL FIELD

The present technology relates to a vulcanization device for a pneumatic tire and a method for vulcanizing a pneumatic tire, and more particularly, to a vulcanization device for a pneumatic tire and a method for vulcanizing a pneumatic tire, that can sufficiently apply internal pressure to a green tire in the initial stage of vulcanization and prevent over-vulcanization with no increase in equipment size.

BACKGROUND ART

A method for vulcanizing a green tire is known that includes inserting a vulcanization bladder into a green tire placed in a mold, introducing steam to be a heating medium into the vulcanization bladder, and then introducing nitrogen gas (inert gas) to be a pressurizing medium into the same. The vulcanization time is determined on the basis of a portion requiring the longest vulcanization time (a portion where the vulcanization speed is slowest). For example, an unvulcanized rubber containing a large amount of silica requires a long vulcanization time. Thus, when a green tire composed of a tread rubber containing a large amount of silica is vulcanized, the vulcanization time is determined on the basis of the tread portion, and over-vulcanization occurs more readily in portions other than the tread portion as the vulcanization is performed at higher temperature. The greater the over-vulcanization, the more adversely affected the physical properties of the vulcanized rubber are. It is thus desirable to prevent over-vulcanization to the utmost.

A low internal pressure applied by the vulcanization bladder to the green tire in the initial stage of vulcanization causes the unvulcanized rubber to flow insufficiently and may thus cause vulcanization defects. Such vulcanization defects are significant especially in vulcanizing a tire having high rigidity.

A vulcanization device has been proposed that, for example, preliminarily mixes steam and inert gas in a tank and introduces the resultant gas mixture into a vulcanization bladder (see Japanese Unexamined Patent Application Publication No. H09-76239A). With this vulcanization device, introducing the gas mixture in the tank into the vulcanization bladder can increase internal pressure applied to a green tire in the initial stage of vulcanization. Moreover, the vulcanization time can be shortened to some extent. Unfortunately, this device requires a tank for preliminarily mixing steam and inert gas, resulting in an increase in equipment size.

SUMMARY

The present technology provides a vulcanization device for a pneumatic tire and a method for vulcanizing a pneumatic tire that can sufficiently apply internal pressure to a green tire in the initial stage of vulcanization and prevent over-vulcanization with no increase in equipment size.

To achieve the foregoing, a vulcanization device for a pneumatic tire according to the present technology includes a vulcanization bladder having a tube-like shape, a heating medium supply line and a pressurizing medium supply line communicably connected to an inside of the vulcanization bladder, and a pressurizing medium low-pressurization/supply line and a circulation line communicably connected to the inside of the vulcanization bladder. A heating medium is supplied into the vulcanization bladder through the heating medium supply line. A pressurizing medium is supplied into the vulcanization bladder through the pressurizing medium supply line. The pressurizing medium having a relatively low pressure flows and is supplied into the vulcanization bladder through the pressurizing medium low-pressurization/supply line to inflate the vulcanization bladder at a start of vulcanization. The heating medium is supplied into the vulcanization bladder through the heating medium supply line upon the vulcanization bladder being in an inflated state. Media in the vulcanization bladder circulates through the circulation line upon the heating medium being supplied into the vulcanization bladder. The media having a relatively high pressure flows and is supplied in the vulcanization bladder through the pressurizing medium supply line upon the media in the vulcanization bladder circulating through the circulation line to increase internal pressure of the vulcanization bladder.

In a method for vulcanizing a pneumatic tire according to the present technology including supplying a heating medium and a pressurizing medium into a vulcanization bladder having a tube-like shape inserted into a green tire in a vulcanization mold to vulcanize the green tire, the method including the steps of: upon a pressurizing medium having a relatively high pressure being used as the pressurizing medium and a pressurizing medium having a relatively low pressure being used as the pressurizing medium, supplying the pressurizing medium having a relatively low pressure into the vulcanization bladder to inflate the vulcanization bladder, and thereafter; supplying the heating medium into the vulcanization bladder, and thereafter; supplying the pressurizing medium having a relatively high pressure into the vulcanization bladder to increase internal pressure of the vulcanization bladder while circulating the media in the vulcanization bladder through a circulation line extending outside the vulcanization bladder, and vulcanizing the green tire.

According to the present technology, after the pressurizing medium having a relatively low pressure is supplied into the vulcanization bladder to inflate the vulcanization bladder, the heating medium is supplied into the vulcanization bladder. Thus, the vulcanization bladder can be heated rapidly while internal pressure is sufficiently applied to the green tire in the initial stage of vulcanization. This is advantageous in that unvulcanized rubber is prevented from flowing insufficiently. Since the pressurizing medium first applies internal pressure to the vulcanization bladder, the temperature of the heating medium can be lower than the temperature in the case of conventional devices. Thereafter, while the media in the vulcanization bladder are circulated through the circulation line extending outside the vulcanization bladder, the pressurizing medium having a relatively high pressure is supplied into the vulcanization bladder to increase internal pressure of the vulcanization bladder, thereby vulcanizing the green tire. This reduces vulcanization temperature in comparison with conventional devices, resulting in minimization of portions where over-vulcanization occurs. Only the line for generating the pressurizing medium having a relatively low pressure and supplying the medium into the vulcanization bladder are required to be added to conventional equipment to obtain equipment achieving the present technology. Accordingly, the equipment is not increased in size.

For example, the pressurizing medium having a relatively high pressure is supplied to the pressurizing medium low-pressurization/supply line branched off from the pressurizing medium supply line for supplying the pressurizing medium having a relatively high pressure into the vulcanization bladder, and the pressurizing medium having a relatively low pressure reduced by the pressure reducing valve disposed on the pressurizing medium low-pressurization/supply line is supplied through the pressurizing medium low-pressurization/supply line into the vulcanization bladder. This eliminates the need for completely separately providing a line for supplying the pressurizing medium having a relatively low pressure into the vulcanization bladder and a line for supplying the pressurizing medium having a relatively high pressure into the vulcanization bladder. Accordingly, the equipment can be further compact. When an existing pressurizing medium supply line is available, the line can be advantageously used.

The pressure of the pressurizing medium having a relatively low pressure is determined to be, for example, from 10% to 40% of the pressure of the pressurizing medium having a relatively high pressure. By determining the pressure within this range, more appropriate internal pressure is applied to the green tire in the initial stage of vulcanization, and vulcanization temperature is reduced for vulcanization at a more appropriate temperature.

DETAILED DESCRIPTION

Figure 1:
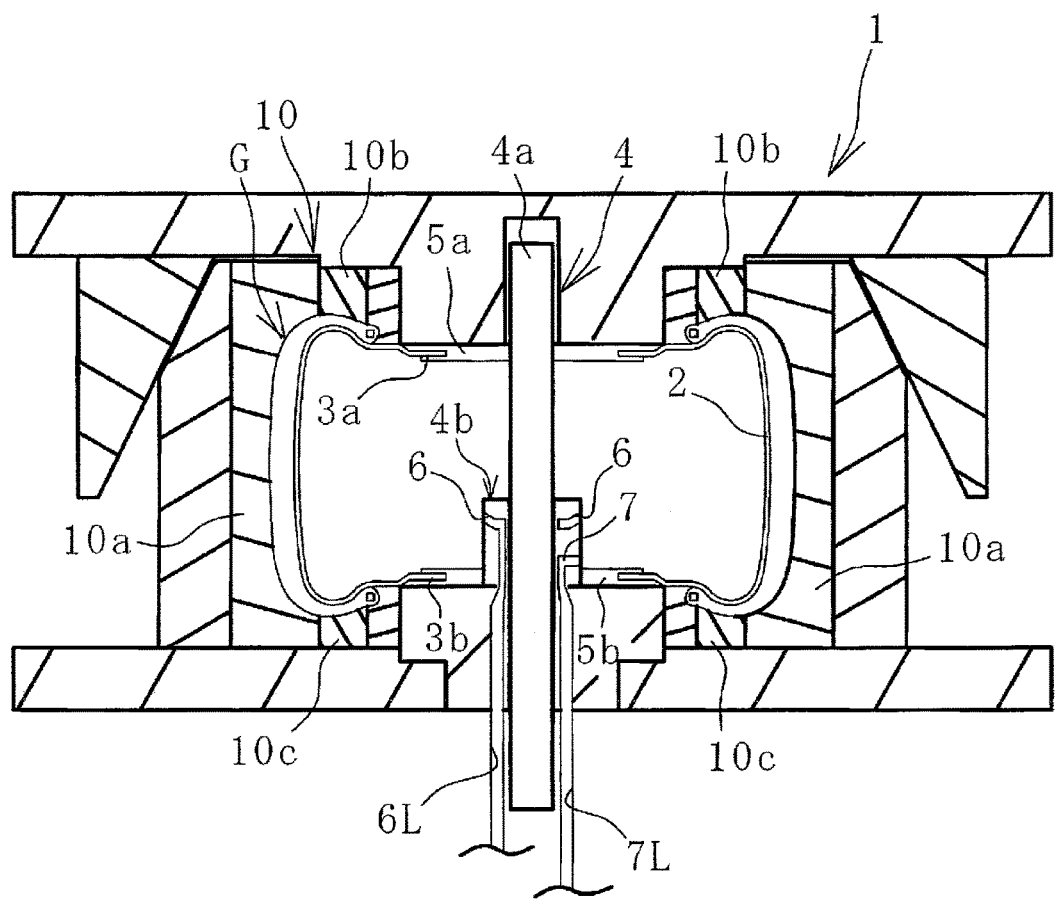
FIG. 1 is an explanatory view exemplifying the overview of a vulcanization device for a pneumatic tire according to the present technology, viewed in a vertical cross-section.

A vulcanization device for a pneumatic tire and a method for vulcanizing a pneumatic tire according to the present technology will now be described with reference to embodiments illustrated in the drawings.

Figure 2:
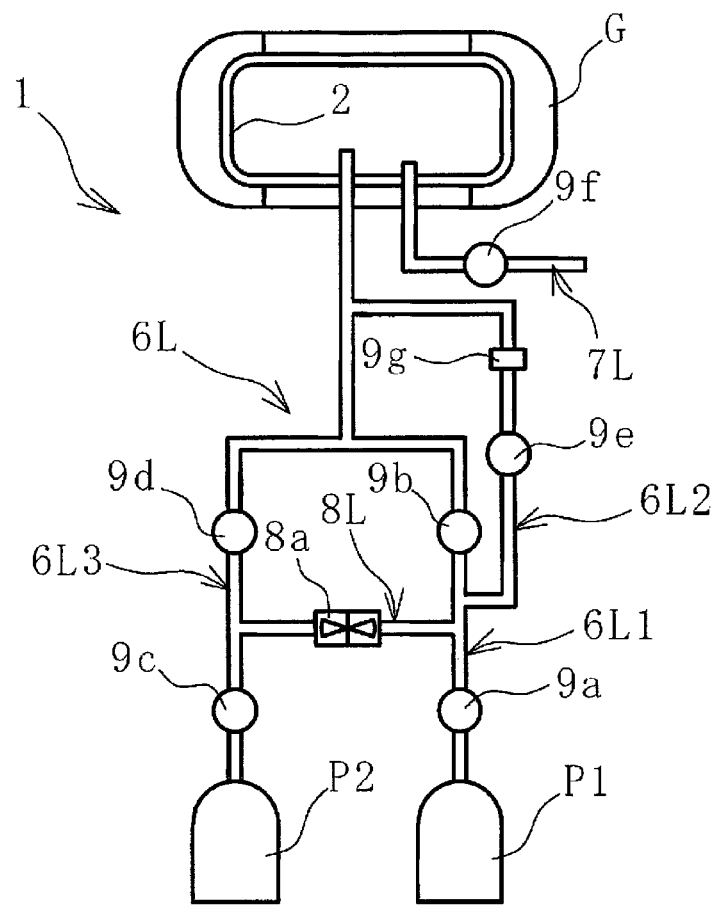
FIG. 2 is an explanatory view exemplifying the vulcanization device in FIG. 1 in a simplified manner.

A vulcanization device 1 for a pneumatic tire (hereinafter referred to as vulcanization device 1) exemplified in FIGS. 1 and 2 according to the present technology includes a vulcanization bladder 2 having a tube-like shape and is made from a rubber. An upper clamp portion 3a and a lower clamp portion 3b of the vulcanization bladder 2 are held by an upper clamp holding section 5a and a lower clamp holding section 5b, respectively, each having a disk shape and being attached to a center post 4a of which a center mechanism 4 is composed.

A cylindrical hub portion 4b is disposed on the outer peripheral side of the center post 4a. An introduction port 6 for introducing steam to be a heating medium and inert gas (such as nitrogen gas) to be a pressurizing medium into the vulcanization bladder 2 and a discharge port 7 for discharging the heating medium and the pressurizing medium from the inside to the outside of the vulcanization bladder 2 are formed in the hub portion 4b.

For example, four introduction ports 6 and one discharge port 7 are formed in the hub portion 4b, and the introduction ports 6 are located at regular intervals in the circumferential direction. The numbers of the introduction ports 6 and the discharge ports 7 may be determined as desired.

The introduction ports 6 and the discharge port 7 are connected to a supply line 6L and a discharge line 7L, respectively, extending downward from the vulcanization device 1. The introduction ports 6 are located upward with respect to the discharge port 7. Furthermore, a circulation line 8L extending outside the vulcanization bladder 2 is provided.

The supply line 6L includes a pressurizing medium supply line 6L1, a pressurizing medium low-pressurization/supply line 6L2, and a heating medium supply line 6L3. The pressurizing medium supply line 6L1 is a line for supplying the pressurizing medium having a relatively high pressure sent from a pressurizing medium supply source P1, into the vulcanization bladder 2. The magnitude of the pressure of the pressurizing medium having a relatively high pressure is, for example, a typical magnitude of the pressure of a pressurizing medium used for tire vulcanization. The pressurizing medium low-pressurization/supply line 6L2 is a line for reducing the pressure of the pressurizing medium having a relatively high pressure sent from the pressurizing medium supply source P1 and supplying the pressurizing medium having a relatively low pressure in comparison with the pressure supplied by the pressurizing medium supply line 6L1, into the vulcanization bladder 2.

In this embodiment, the pressurizing medium low-pressurization/supply line 6L2 includes a branch line branched off from the pressurizing medium supply line 6L1 and a pressure reducing valve 9g disposed on the branch line. An open/close valve 9e for opening/closing the pressurizing medium low-pressurization/supply line 6L2 is also disposed on the line 6L2.

The heating medium supply line 6L3 is a line for supplying the heating medium sent from a heating medium supply source P2 into the vulcanization bladder 2. The circulation line 8L is a line for circulating the media (the pressurizing medium and the heating medium) in the vulcanization bladder 2. In this embodiment, the circulation line 8L is formed by coupling the pressurizing medium supply line 6L1 with the heating medium supply line 6L3. That is, the circulation line 8L is formed by including portions of the pressurizing medium supply line 6L1 and the heating medium supply line 6L3. A circulator 8a, such as a circulation pump, for circulating the media is disposed on the circulation line 8L.

Open/close valves 9a, 9b for opening/closing the pressurizing medium supply line 6L1 are disposed on the line 6L1. One open/close valve 9a is located near the pressurizing medium supply source P1 with respect to the circulation line 8L, and the other open/close valve 9b is located near the vulcanization bladder 2 with respect to the fork of the line 6L1 and the pressurizing medium low-pressurization/supply line 6L2, on the circulation line 8L.

Open/close valves 9c, 9d for opening/closing the heating medium supply line 6L3 are disposed on the supply line 6L3. One open/close valve 9c is located near the heating medium supply source P2 with respect to the circulation line 8L, and the other open/close valve 9d is located on the circulation line 8L. An open/close valve 9f for opening/closing the discharge line 7L is disposed on the line 7L. A controller controls opening/closing of the open/close valves 9a to 9f and the pressure reducing valve 9g. Thus, the supply lines 6L1, 6L2, 6L3, the circulation line 8, and the discharge line 7L communicate with the inside of the vulcanization bladder 2 by opening their respective valve(s).

To vulcanize a green tire G with the vulcanization device 1 according to the present technology, first, the green tire G is placed in a mold 10 in a horizontal state. In this embodiment, the mold 10 includes annular sectors 10a divided in plurality in the circumferential direction, an annular side plate 10b disposed on an upper side, and an annular side plate 10c disposed on a lower side. The vulcanization bladder 2 is inserted into the green tire G. The mold 10 is closed.

Next, a pressurizing medium having a relatively high pressure and room temperature sent from the pressurizing medium supply source P1 flows into the pressurizing medium low-pressurization/supply line 6L2. The pressure reducing valve 9g reduces the pressure of the pressurizing medium having a relatively high pressure flowing in the pressurizing medium low-pressurization/supply line 6L2 to generate a pressurizing medium having a relatively low pressure. The pressurizing medium having a relatively low pressure is supplied into the vulcanization bladder 2. After the vulcanization bladder 2 is inflated only with the pressurizing medium having a relatively low pressure to have predetermined internal pressure, the supply of the pressurizing medium having a relatively low pressure is stopped. The inflated vulcanization bladder 2 presses the inner peripheral surface of the green tire G, and the green tire G is pressed against the mold 10.

Next, a heating medium at a predetermined temperature (predetermined pressure) sent from the heating medium supply source P2 is supplied through the heating medium supply line 6L3 into the vulcanization bladder 2 for a predetermined time. This operation heats the vulcanization bladder 2 to have a high temperature and allows the unvulcanized rubber of the green tire G to substantially start flowing. At this time, since the supplied pressurizing medium has already applied internal pressure to some extent to the vulcanization bladder 2, the temperature of the supplied heating medium can be lower than the temperature in the case of conventional devices. That is, the heating medium is supplied at a temperature purely determined to be appropriate for vulcanization without consideration of applying internal pressure to the vulcanization bladder 2.

Next, the circulator 8a is activated to circulate the media (the pressurizing medium and the heating medium) in the vulcanization bladder 2 through the circulation line 8L, thereby uniformizing the internal temperature of the vulcanization bladder 2 (the temperature of the vulcanization bladder 2). When the internal temperature of the vulcanization bladder 2 (the temperature of the vulcanization bladder 2) reaches an appropriate temperature (temperature state), the supply of the heating medium is stopped.

Next, while the media in the vulcanization bladder 2 are circulated through the circulation line 8L, only the pressurizing medium having a relatively high pressure and room temperature sent from the pressurizing medium supply source P1 is supplied through the pressurizing medium supply line 6L1 into the vulcanization bladder 2. That is, the pressurizing medium having a relatively high pressure in comparison with the pressure supplied through the pressurizing medium low-pressurization/supply line 6L2 is supplied into the vulcanization bladder 2 to increase the internal pressure of the vulcanization bladder 2. The vulcanization bladder 2 further inflated through this process presses the inner peripheral surface of the green tire G more strongly, the green tire G is pressed against the mold 10 more strongly and heated, and vulcanization is performed on a full scale.

After a lapse of a predetermined time, the circulation of the media in the vulcanization bladder 2 through the circulation line 8L is stopped. Then, the open/close valve 9f is opened to discharge the media remaining in the vulcanization bladder 2 through the discharge line 7L to the outside of the vulcanization bladder 2. Thereafter, the upper side plate 10b is moved upward and each of the sectors 10a is moved in the diameter expanding direction to open the mold 10.

Next, the vulcanized tire is moved upward to be separated from the shrunken vulcanization bladder 2, thereby removing the tire from the vulcanization device 1.

According to the present technology, after the pressurizing medium having a relatively low pressure is supplied into the vulcanization bladder 2 to inflate the vulcanization bladder 2, the heating medium is supplied into the vulcanization bladder 2. Thus, the vulcanization bladder 2 can be heated rapidly while internal pressure is sufficiently applied to the green tire G in the initial stage of vulcanization. This is advantageous in that the unvulcanized rubber is prevented from flowing insufficiently and vulcanization defects are prevented.

Since the pressurizing medium first applies internal pressure to the vulcanization bladder 2, the temperature of the heating medium supplied into the vulcanization bladder 2 can be lower than temperature in the case of conventional devices. This is advantageous in that vulcanization temperature is reduced in comparison with conventional devices to minimize portions where over-vulcanization occurs.

The pressure of the pressurizing medium having a relatively low pressure supplied through the pressurizing medium low-pressurization/supply line 6L2 into the vulcanization bladder 2 is determined to be, for example, from 10% to 40% of the pressure of the pressurizing medium having a relatively high pressure supplied through the pressurizing medium supply line 6L1 into the vulcanization bladder 2. Since the pressure of the pressurizing medium having a relatively low pressure is determined within this range, more appropriate internal pressure is applied to the green tire G in the initial stage of vulcanization, and vulcanization temperature is reduced for vulcanization at a more appropriate temperature.

Only the pressurizing medium low-pressurization/supply line 6L2 for supplying the pressurizing medium having a relatively low pressure into the vulcanization bladder 2 are required to be added to obtain equipment achieving the present technology. Accordingly, the equipment does not need to be increased in size.

In this embodiment, the pressurizing medium low-pressurization/supply line 6L2 includes the branch line branched off from the pressurizing medium supply line 6L1 and the pressure reducing valve 9g disposed on the branch line. This configuration eliminates the need for completely separately providing a line for supplying the pressurizing medium having a relatively low pressure into the vulcanization bladder 2 and a line for supplying the pressurizing medium having a relatively high pressure into the vulcanization bladder 2. Accordingly, the equipment can be further compact. When an existing pressurizing medium supply line 6L1 is available upon modification of a vulcanization device, the line 6L1 can be advantageously used. That is, the vulcanization device 1 according to the present technology can be produced from an existing vulcanization device without significant modification.

Figure 3:
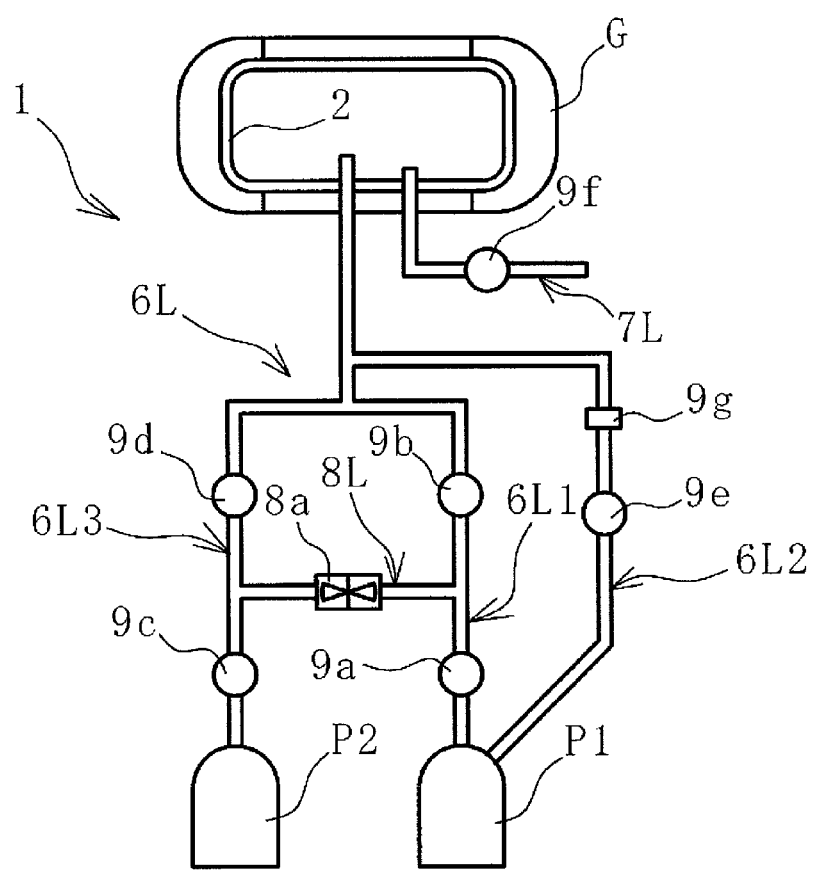
FIG. 3 is an explanatory view exemplifying a vulcanization device according to another embodiment of the present technology in a simplified manner.

As exemplified in FIG. 3, the pressurizing medium low-pressurization/supply line 6L2 for supplying the pressurizing medium having a relatively low pressure into the vulcanization bladder 2 and the pressurizing medium supply line 6L1 for supplying the pressurizing medium having a relatively high pressure into the vulcanization bladder 2 may be provided completely separately.

EXAMPLES

Tires (having a size of 235/50/R18) for passenger vehicles were vulcanized by five methods shown in Table 1 (Conventional Example, Comparative Example, and Examples 1 to 3), and rolling resistance and the occurrence rates of vulcanization defects of the produced tires were checked. The results are shown in Table 1. Examples 1 to 3 used the same vulcanization device as that exemplified in FIGS. 1 and 2. First, nitrogen gas having a relatively low pressure was introduced into the vulcanization bladder. Thereafter, steam was introduced into the bladder, and then nitrogen gas having a relatively high pressure was introduced thereinto while the media (the steam and the nitrogen gas) in the vulcanization bladder were circulated through the circulation line, thereby vulcanizing a green tire. For Conventional Example and Comparative Example, a green tire was vulcanized by the same processes as those for Examples 1 to 3 but without preliminarily introducing the nitrogen gas having a relatively low pressure into the vulcanization bladder.

The pressure of introduced steam in Table 1 are expressed as index values with the pressure of Conventional Example being defined as the reference (100). A greater index indicates a higher pressure. The pressure of introduced nitrogen gas and the pressure of introduced initial nitrogen gas in Table 1 are expressed as index values with the pressure of introduced nitrogen gas of Conventional Example being defined as the reference (100). A smaller index indicates a lower pressure. The volume percent of initial nitrogen gas and steam in Table 1 indicate volume percent in the vulcanization bladder after the introduction of steam.

The rolling resistance in Table 1 was expressed as index values with in the rolling resistance of Conventional Example being defined as the reference (100). A smaller index indicates less resistance and superior performance. A tire over-vulcanized to a greater extent tends to have greater rolling resistance. The occurrence rate of vulcanization defects in Table 1 was expressed as index values with in the occurrence rate of Conventional Example being defined as the reference (5). A smaller index indicates that vulcanization defects occurred at a lower rate.

TABLE 1

|  |  | Example 1 | Example 2 | Example 3 | Conventional Example | Comparative Example |
|---|---|---|---|---|---|---|
| Introduction order ↓ | Pressure of introduced initial nitrogen gas (index value) | 25 | 25 | 25 | — | — |
|  | Pressure of introduced steam (index value) | 130 | 130 | 130 | 100 | 130 |
|  | Pressure of introduced nitrogen gas (index value) | 100 | 100 | 100 | 100 | 100 |
| Volume percent of initial nitrogen gas and steam |  | Steam 50% Nitrogen gas 50% | Steam 70% Nitrogen gas 30% | Steam 85% Nitrogen gas 15% | — | — |
| Tire rolling resistance (index value) |  | 94 | 96 | 98 | 100 | 106 |
| Occurrence rate of vulcanization defects (index value) |  | 1 | 1 | 1 | 5 | 1 |

The results in Table 1 confirm that, in Examples 1 to 3, the tire rolling resistance was less than that of Conventional Example and over-vulcanization was prevented. The results also confirm that vulcanization defects were effectively prevented in Examples 1 to 3.

The invention claimed is:

1. A vulcanization device for a pneumatic tire comprising:
   a vulcanization bladder having a tube-like shape;
   a heating medium supply line and a pressurizing medium supply line communicably connected to an inside of the vulcanization bladder,
   a heating medium being supplied into the vulcanization bladder through the heating medium supply line, the heating medium being steam, and
   a pressurizing medium being supplied into the vulcanization bladder through the pressurizing medium supply line, the pressurizing medium being inert gas; and
   a pressurizing medium low-pressurization/supply line and a circulation line communicably connected to the inside of the vulcanization bladder;
   wherein
   the pressurizing medium having a low pressure flows and is supplied into the vulcanization bladder through the pressurizing medium low-pressurization/supply line to inflate the vulcanization bladder at a start of vulcanization,
   the heating medium is supplied into the vulcanization bladder through the heating medium supply line upon the vulcanization bladder being in an inflated state,
   media in the vulcanization bladder circulates through the circulation line upon the heating medium being supplied into the vulcanization bladder, and
   the media having a high pressure flows and is supplied into the vulcanization bladder through the pressuring medium supply line upon the media in the vulcanization bladder circulating via the circulation line to increase internal pressure of the vulcanization bladder;
   wherein a pressure of the pressurizing medium having a low pressure is from 10% to 40% of a pressure of the pressurizing medium having a high pressure;
   after a heating medium is supplied to the interior of the vulcanization bladder for a predetermined time, while the media in the interior of the vulcanization bladder is circulated through the circulation line, the pressurizing medium having a high pressure is supplied into the interior of the vulcanization bladder.

2. The vulcanization device for a pneumatic tire according to claim 1, wherein the pressurizing medium low-pressurization/supply line comprises a branch line branched off from the pressurizing medium supply line and a pressure reducing valve disposed on the branch line.

3. A method for vulcanizing a pneumatic tire, including supplying a heating medium and a pressurizing medium into a vulcanization bladder having a tube-like shape inserted into a green tire in a vulcanization mold to vulcanize the green tire, the heating medium being steam and the pressurizing medium being inert gas, the method comprising the steps of:

upon a pressurizing medium having a high pressure being used as the pressurizing medium and a pressurizing medium having a low pressure being used as the pressurizing medium, supplying the pressurizing medium having a low pressure into the vulcanization bladder to inflate the vulcanization bladder; thereafter supplying the heating medium into the vulcanization bladder; and thereafter supplying the pressurizing medium having a high pressure into the vulcanization bladder to increase internal pressure of the vulcanization bladder while circulating media in the vulcanization bladder through a circulation line extending outside the vulcanization bladder and vulcanizing the green tire;

wherein a pressure of the pressurizing medium having a low pressure is determined to be from 10% to 40% of a pressure of the pressurizing medium having a high pressure.

4. The method for vulcanizing a pneumatic tire according to claim 3, wherein upon supplying the pressurizing medium having a low pressure into the vulcanization bladder, the pressurizing medium having a high pressure is supplied to a pressurizing medium low-pressurization/supply line branched off from a pressurizing medium supply line configured to allow the pressurizing medium having a high pressure to be supplied into the vulcanization bladder, and the pressurizing medium having a low pressure reduced by a pressure reducing valve disposed on the pressurizing medium low-pressurization/supply line is supplied through the pressurizing medium low-pressurization/supply line into the vulcanization bladder.

* * * * *